Oct. 6, 1953  E. AURIOL  2,654,264
POWER PRESS AND THE LIKE THRUST-CONTROLLED MACHINES
Filed Nov. 29, 1950  8 Sheets-Sheet 2

INVENTOR
ELOI AURIOL
By: Young, Emery & Thompson
Attys.

Oct. 6, 1953    E. AURIOL    2,654,264
POWER PRESS AND THE LIKE THRUST-CONTROLLED MACHINES
Filed Nov. 29, 1950    8 Sheets-Sheet 3
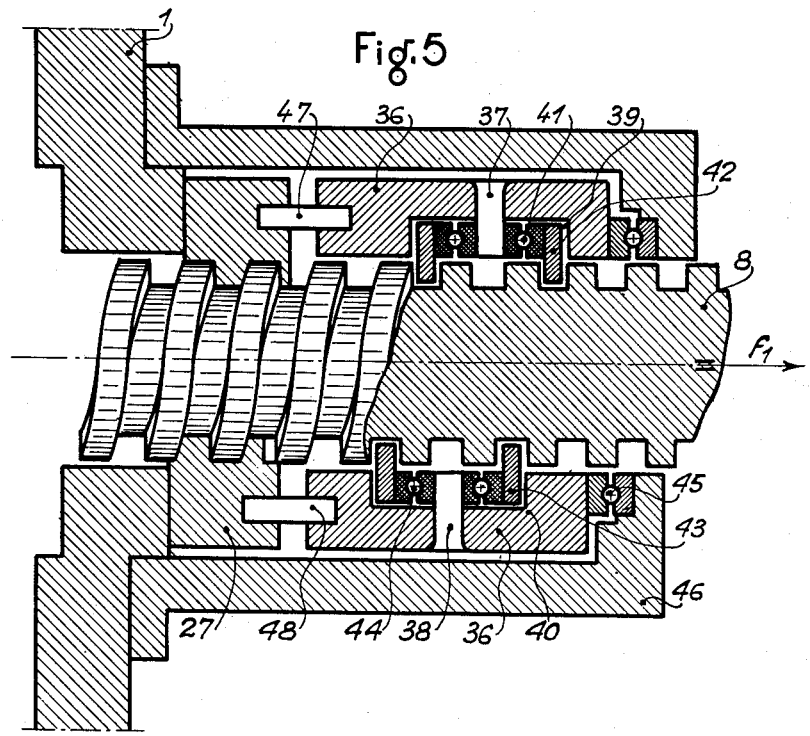
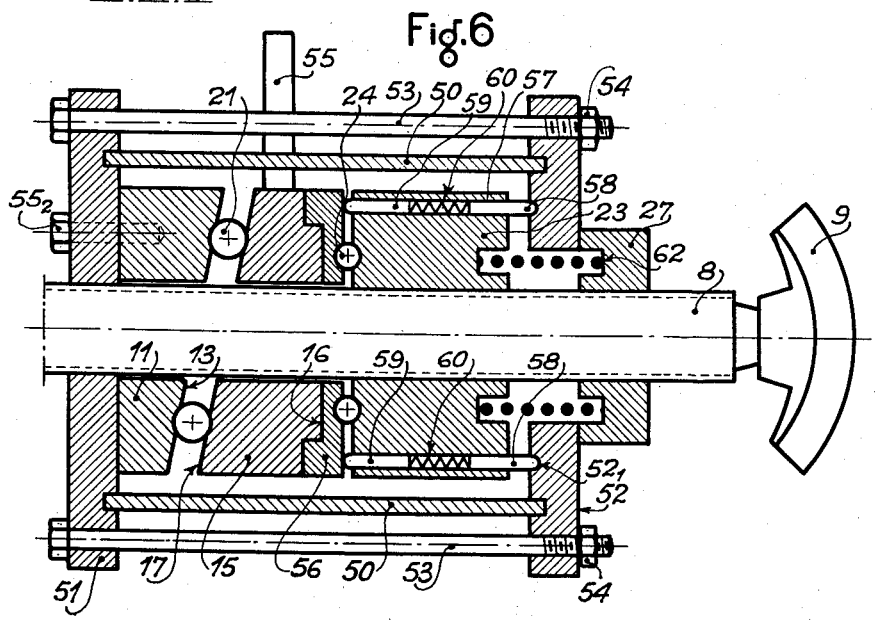
INVENTOR:
ELOI AURIOL
By Young, Emery & Thompson
Att'ys Oct. 6, 1953 — E. AURIOL — 2,654,264
POWER PRESS AND THE LIKE THRUST-CONTROLLED MACHINES
Filed Nov. 29, 1950 — 8 Sheets-Sheet 4

INVENTOR:
ELOI AURIOL
By Young, Emery & Thompson
Attys

Oct. 6, 1953   E. AURIOL   2,654,264
POWER PRESS AND THE LIKE THRUST-CONTROLLED MACHINES
Filed Nov. 29, 1950   8 Sheets-Sheet 5

INVENTOR:
ELOI AURIOL
By: Young, Emery & Thompson
Attys.

Fig.15
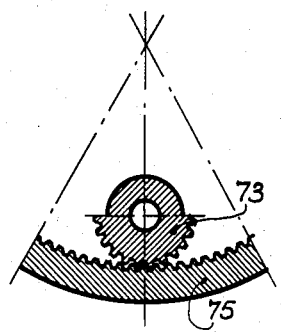
Fig.16
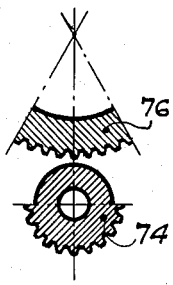
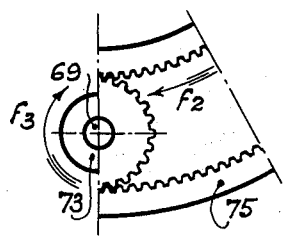
Fig.17
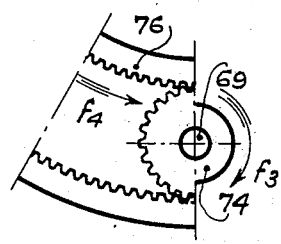
Fig.18

Patented Oct. 6, 1953

2,654,264

UNITED STATES PATENT OFFICE 2,654,264

POWER PRESS AND THE LIKE THRUST-CONTROLLED MACHINES

Eloi Auriol, Toulouse, France

Application November 29, 1950, Serial No. 198,067
In France December 1, 1949

16 Claims. (Cl. 74—479)

1

Known power presses operated through an eccentrically hinged lever show numerous drawbacks. They produce, as a mater of fact, substantial frictional losses and are of an intricate cumbersome structure. Furthermore, most of them are reversible.

Similarly known screw presses are simple, powerful and non-reversible; they are of restricted bulk and they are easy to execute, but they also lead to considerable losses of energy by reason of the friction appearing on the bearing surfaces of the screw threads. The efficiency of such presses is, therefore, low.

My invention has for its object to remove the drawbacks of these known presses and it covers a machine incorporating a thrust member and more particularly a power press, characterized by two helical slopes, assuming the same shape of which one is stationary and the other is rotatable and moves axially in unison with the thrust member while balls or the like rolling means are held between said helical slopes in order to allow giving the rotatable slope an angular shifting and thereby to axially shift the slope and the thrust member with which it is rigid, the amount of energy absorbed through friction being reduced to a minimum.

According to a further feature of my invention, the thrust member is carried endwise by a control screw the axial shifting of which is produced through the agency of a thrust nut screwed over said screw and submitted to the axial shifting action of the rotary helical slope.

A further object of my invention consists in providing a machine of the type disclosed with a revoluble control ring fitted freely over the control screw and carrying the rotatable helical slope, while the stationary helical slope is carried by a sleeve through which the screw passes freely and that bears against the frame of the machine.

According to a further object of my invention, the screw carrying endwise the operative member, may be driven into rotation in order to make said screw into the thrust nut and to execute thus a rough movement whereby the operative member advances towards its operative position.

A still further embodiment of the invention consists in providing an elastic connection between the thrust nut screwed over the control screw and a further nut screwed over said screw and adapted to bear against the frame of the machine on the outside thereof under the effect of the reaction of the work, whereby in particular said further or outer nut may be caused to rotate over the screw through the agency of the previously stressed elastic means and to remain thus constantly urged against the frame.

In a preferred embodiment of my invention, the thrust nut screwed over the control screw is rigid, as it rotates, with the control ring through the agency of a driving means for a single direction of rotation, which allows, during the return stroke of this control ring, screwing the thrust nut over the screw and holding said nut urged against the control ring that is itself in contact with the cooperating sleeve, said rotation of the thrust nut producing a tensioning of the yielding means connecting said thrust nut with the outer nut.

My invention also covers various features and combinations thereof, as described hereinafter. I have illustrated by way of example various embodiments of a press according to my invention in accompanying drawings, wherein:

Fig. 5 is an axial cross-sectional view of an arrangement urging the thrust nut rearwardly.

Fig. 6 is an axial cross-sectional view of the control mechanism of a machine according to a further embodiment of my invention.

Figure 14:
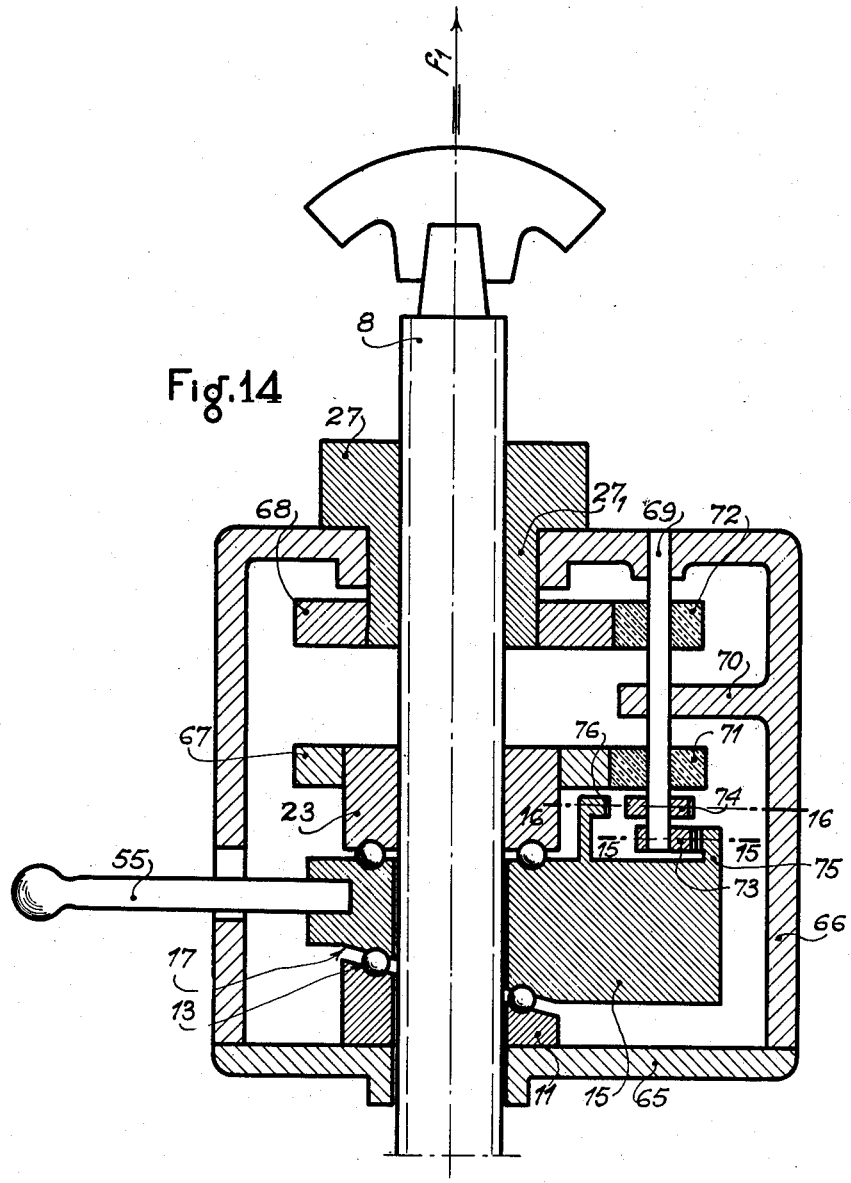
Fig. 14 is an axial cross-sectional view of a still further embodiment of my invention.

Figs. 15 and 16 are two partial cross-sections of the machine in Fig. 14 through lines 15—15 and 16—16 of Fig. 14.

Fig. 17 illustrates the relative position of the toothed segments and of the cooperating pinion provided with teeth over half its periphery at the end of the return stroke in last mentioned machine;

Fig. 18 illustrates the relative position of the same toothed segments and of the other pinion provided with teeth over half its periphery at the end of the active stroke.

Figure 19:
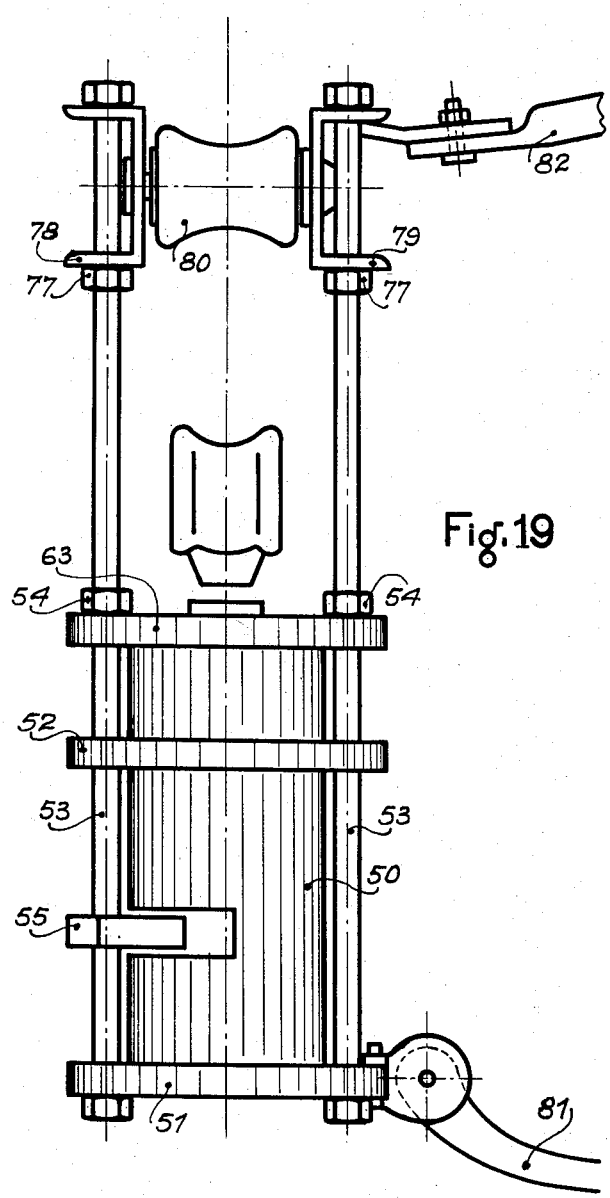

Fig. 19 is a side view illustrating the application of my invention to a tube-bending machine.

Figure 1:
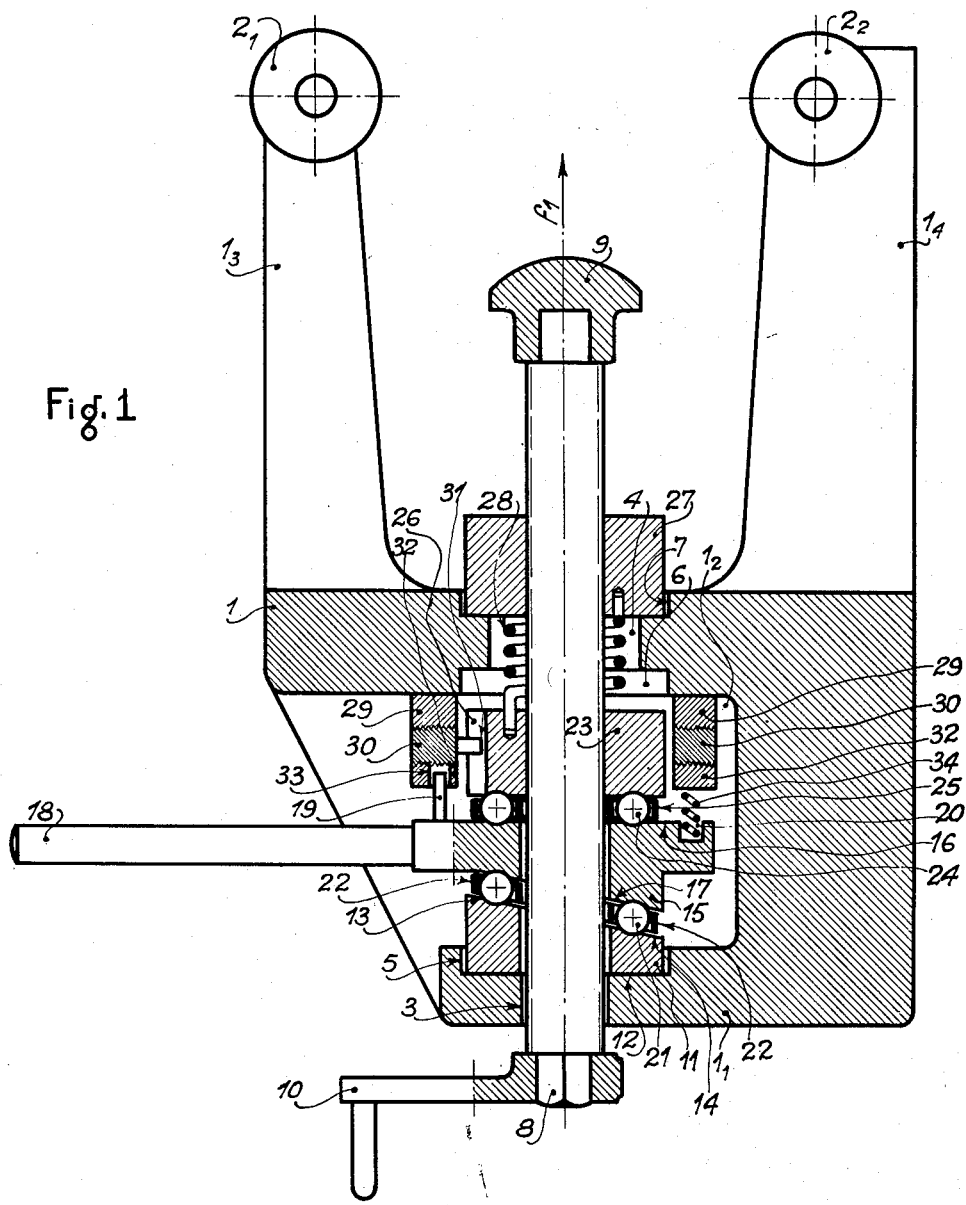
Fig. 1 is a sectional view through the axis of the screw of a metal bending press according to my invention.

Turning to Fig. 1, the metal bending press includes the following chief components:

(a) A frame 1 with its base 11 adapted to rest on the ground or on a suitable support, said frame containing a chamber 12 opening upwardly, while its arms 13, 14 extending laterally carry bearing rollers 21 and 22.

The chamber 12 in the frame registers with two axial holes 3 and 4 while two inner cup-shaped recesses 5 and 6 and an outer cup-shaped recess 7 are provided coaxially with said holes in the walls of the frame.

(b) A control screw 8 extending freely through the frame 1 and the chamber 12 and axially of the openings 3 and 4. Said screw 8 carries at the end facing the rollers 21 and 22 a thrust member constituted by a shaping head 9 capping its end and adapted to turn round the axis of the screw the opposite end of which carries a crank 10 fitted over a polygonal part of said screw 8. The rollers 21 and 22 form the members cooperating with the thrust member 9.

Figure 2:
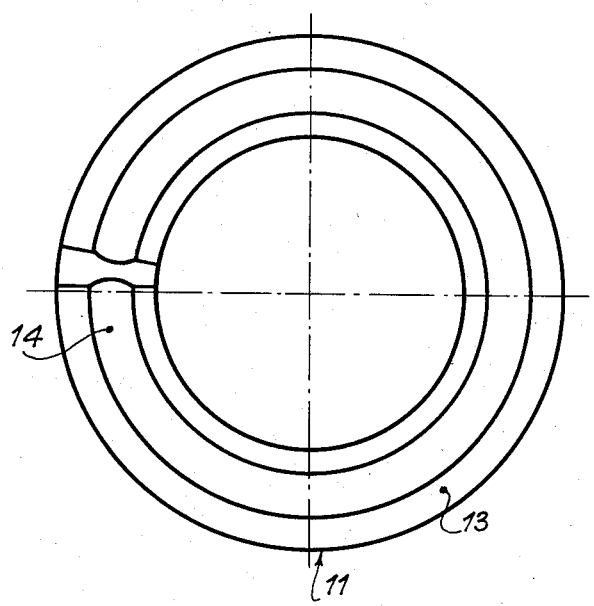
Figs. 2 and 3 are a plan and an elevational view of the sleeve provided with a helical slope.
Figure 3:
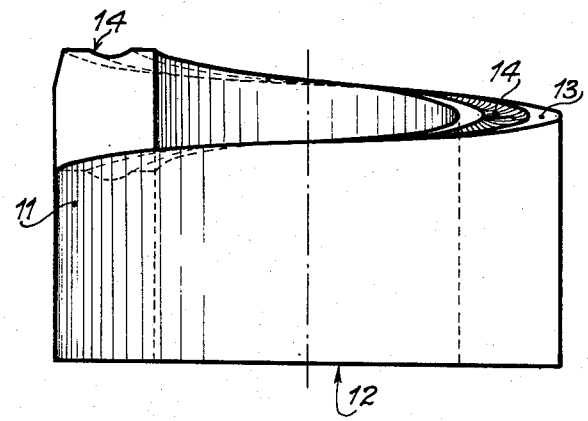
Figure 4:
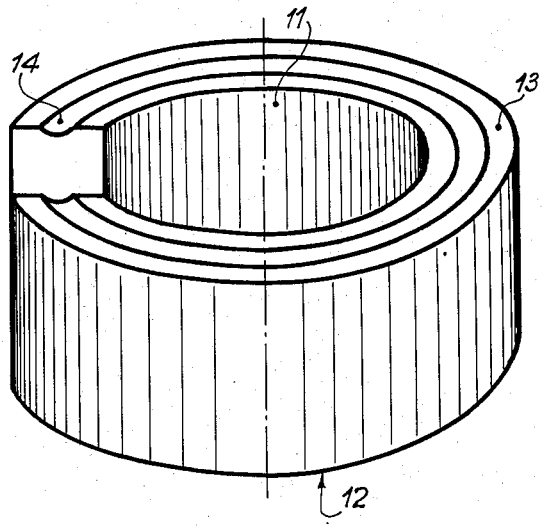
Fig. 4 is a perspective view of the same sleeve.

(c) A control device provided with helical slopes and including a slope carrying sleeve 11 assuming the shape of a ring as shown in Figs. 2, 3 and 4, said ring showing on one side a flat surface 12 that is perpendicular to the axis of the sleeve, the other end of which assumes the shape of a helical slope 13 inside which is cut a groove 14 forming a ball race.

Said sleeve or slope carrier 11 is fitted freely over the screw 8 with its flat surface 12 resting in the bottom of the cup-shaped part 5 terminating the recess in the frame.

Over the screw 8 and beyond the slope sleeve 11 is fitted freely a control ring 15 having a flat surface 16 perpendicular to the axis of said ring and facing the rollers 21 and 22 while the opposite side of the ring assumes a helical shape forming a slope 17 the pitch of which is equal to that of the slope 13 on the sleeve 11 and is provided with a similar groove forming a ball race.

The control ring 15 is rigid with a control lever 18 and with a projection or stud 19. It shows on the side facing the rollers a small cup-shaped recess 20 housing a spring 34 the part played by which will be disclosed hereinafter.

Balls 21 held inside a cage 22 are carried between the two helical slopes on the sleeve 11 and on the control ring 16 and are adapted to roll inside the ball races facing one another on said slopes.

The cage 22 holding the balls 21 located between the two helical slopes 13 and 17 also assumes a helical shape and said cage is angularly shifted when the control ring 15 rotates, by angles equal to one half the angle of rotation of said control ring 15, say 45° e. g., if the oscillation imparted to the control ring 15 is equal to 90°.

The cage 22 may thus assume a length that is equal substantially to ⅞ of a circumference and carries a number of balls equal to ⅞ of the number of balls that might be housed inside a ball bearing of the same diameter, in which the annular parts are flat.

A thrust nut 23 is screwed over the screw 8 beyond the control ring. Said nut is provided on its surface facing the control ring 15 with a groove forming a race for an annular series of balls 24 carried between said nut 23 and the control ring 15, said rings being held by a cage 25.

The thrust nut 23 is provided furthermore with an outer longitudinal groove 26.

On the outside of the recess 12 in the frame, a nut 27 is screwed over the screw 8 and said nut 27 resting inside the outer cup 7 of the frame is connected with the inner or thrust nut 23 through a coil spring 28 surrounding the screw 8 and passing through the opening 4 in the frame.

Round the thrust nut 23 are arranged three toothed rings. The first of these rings, or bearing ring 29, engages the inner wall of the chamber 12 of the frame round the periphery of the inner cup-shaped recess 6 thereof and it is provided with teeth directed away from the rollers 21 and 22.

The second or intermediary ring 30 has its two faces provided with teeth arranged in opposite directions and engaging respectively the teeth on the bearing ring, and the teeth on the following ring 32. Said intermediary ring carries furthermore an inwardly directed radial stud 31 engaging the longitudinal groove 26 in the thrust nut 23.

The teeth through which the intermediary ring 30 and the bearing ring 29 engage one another assume a certain slope so as to allow a relative rotation of the intermediary ring 30 over the bearing ring 29 during the return stroke of the control ring 15 while said intermediary ring 30 is held fast over the bearing ring 29 during the reverse operative stroke.

The third ring 32 or outer ring, is provided on the side facing the rollers with teeth engaging the teeth on the corresponding side of the intermediary ring, while its opposite surface is provided with an arcuate groove 33 in which is slidingly engaged the projection or stud 19 on the control ring 15.

The teeth through which the intermediary ring and the outer ring 32 are secured to one another assume a slope such as will allow a rotation of the outer ring with reference to the intermediary ring 30 during the operative stroke of the control ring 15 while on the other hand, the intermediary ring 30 is driven by the outer ring 32 during the return stroke of said control ring 15.

A spring 34 is inserted between the outer ring 32 and the recess 20 in the control ring 15, reference to which spring has been made hereinabove.

The press described hereinabove operates in the following manner:

The part to be bent engaging the rollers 21 and 22, the shaping head 9 is brought into contact therewith through a rotation of the crank 10, whereby the worm 8 screws into the nuts 23 and 27 secured to one another through the spring 28, the thrust nut 23 being held against rotation by the stud 31 of the intermediary ring 30 that is in its turn held fast through engagement of its teeth with those of the bearing ring 29.

When the shaping head 9 engages the part that is to be bent, the reaction of the latter is transmitted through the screw 8 to the outer nut 27 engaging the bottom of the outer cup 7 with a pressure that is sufficient to hold said nut frictionally against rotation.

The crank 10 being then removed, the control lever 18 is given a reciprocating movement in a plane perpendicular to the axis of the control screw 8.

*Operative stroke*

During the operative stroke produced by the lever, the control ring 15 turns round the screw 8 and the helical slope 17 on said ring moves in parallelism with the slope 13 on the sleeve 11 while the balls 21 between the two slopes run in the grooves or races facing one another on said slopes.

Said relative rotation of the control ring 15 with reference to the sleeve 11 that is held fast on the frame, leads thus to an axial shifting of the control ring 15 towards the rollers 2₁ and 2₂.

During this axial displacement in the direction of the arrow $f_1$, the control ring 15 carries along with it the thrust nut 23 and the screw 8 screwed inside said nut, which produces the desired bending stress to be exerted by the shaping head 9 at the end of said screw 8.

During its operative rotation, the control ring 15 moves through the agency of the annular series of balls 24 over the thrust nut 23 without constraining the latter to rotate, as it is held by the radial stud 31 on the intermediary ring 30.

On the contrary, the ring 15 drives through its stud 19 the outer ring 32, the teeth of which ride over the teeth of the intermediary ring 30, the spring 34 returning after each disengagement the two series of teeth into reengagement.

The cylindrical thrust nut 23 moving with the screw in the direction of the arrow $f_1$, the radial stud 31 slides inside the groove 26 of the nut 23 which engages the inner cup-shaped recess 6 of the chamber 1₂ in the frame.

The outer nut 27 has a tendency to follow the axial displacement of the screw 8 in the direction of the arrow $f_1$, but the coil spring 28 that has been tensioned during a preceding operation, is released and constrains the outer nut 27 to rotate with reference to the thrust nut 23 so that said outer nut 27 screws over the screw 8 until it engages again the bottom of the outer cup-shaped recess 7 on the frame 1.

*Return stroke*

When the control lever 18 is shifted in a direction opposed to that precedingly described, in other words, when the lever executes its return stroke, the control ring 15 rotates in a direction that urges apart from one another the helical slopes 13 and 17. The reaction exerted by the part that is being bent on the worm 8, is then transmitted through the outer nut 27 to the frame 1.

The projection 19 rigid with the control ring 15 moves first inside the circular groove 33 of the outer ring 32 without shifting the latter along with it; when said projection 19 engages the further end of this annular groove, it drives the outer ring 32 and, as the latter is in permanent engagement for this direction of rotation with the intermediary ring 30 through the interengagement of the teeth on the two rings considered, said intermediary ring is driven simultaneously with the ring 32. For the direction of rotation considered, the teeth on the inner surface of the intermediary ring ride freely over the teeth of the bearing ring 29 normally in interengaging relationship with the teeth on the intermediary ring.

During this rotary movement corresponding to the return stroke of the lever 18, the intermediary ring 30 drives through its radial stud 31 the thrust nut 23 that screws then over the screw 8 and moves consequently in a direction opposed to the direction of the arrow $f_1$, whereby it shifts the control ring 15 back and provides for the two series of balls 21 and 24 to be held fast between the opposite surfaces of the control ring 15 and respectively either of the adjacent members 11 and 23. During this movement of the thrust nut 23, the stud 31 on the intermediary ring 30 slides inside the longitudinal groove 26 in said nut 23 and the rotation of this nut 23 with reference to the outer nut 27 held fast frictionally against the frame produces a tensioning, through its rotation, of the spring 28 inserted between the two nuts. When this return stroke is at an end, there begins a further operative stroke opposed to the return stroke that has just been executed and during which the different parts cooperate in the manner already disclosed.

When the tube or the like part has been completely bent, the control crank 10 is fitted again over the polygonal end of the screw 8 that may thus be rotated so as to unscrew with reference to the nuts 23, 27, whereby the shaping head is returned into its starting position and the machine is ready for a further operation.

The various parts are made of suitable material such as hardened steel, ordinary steel, cast iron or cast steel, according to requirements.

The arrangement described is applicable to all bending presses, stamping, upsetting, punching presses, wine presses, and also to machines such as jacks, shears and, generally speaking, all machines operating through a gradual movement of a thrust exerting member.

The above described machines may be actuated through a motor or an engine with the insertion between said engine and the lever 18 of a mechanism adapted to transform the continuous rotation of a shaft driven by the engine into a reciprocating movement.

It is possible, moreover, without widening unduly the scope of the invention as defined in accompanying claims, to design in a different manner, the means returning the cylindrical thrust nut 23 into its starting position.

It is possible, for instance, to replace the spring 28 that urges the cylindrical thrust nut in a direction opposed to the direction of the arrow $f_1$ by a positive ratchet control ensuring a reversal of the direction of rotation under the control of the lever 18 acting on the nut 27 during the operative period.

Fig. 5 is an axial sectional view of a modified arrangement for returning the outer nut rearwardly. In this arrangement, a sleeve 36 freely mounted over the screw 8 carries two radial spindles 37 and 38 lying perpendicularly to the axis of the sleeve, facing one another in a common diametrical plane of the sleeve forming the plane of the Fig. 5 and shifted axially with reference to one another by a length equal to one half the pitch of the screw 8.

Two recesses 39 and 40 are provided in the sleeve 36 coaxially with the spindles 37 and 38.

To the spindle 38 is secured the inner race of a ball bearing 41, the outer race of which is rigid with a ring 42 the wall size of which is less than that of a thread of the screw 8 and the diameter of which is such that said ring engages through two diametrically opposed portions thereof two female threads i. e. two intervals separated by successive threads of the screw 8.

In the case illustrated, said ring 42 engages two female threads separated by two male threads and the interval between the latter; the diameter of the ring is thus equal to twice the pitch of the screw 8. The ball bearing 41 and part of the ring 42 rigid with said ball bearing engage the recess 39 provided in the sleeve 36, the ring 42 projecting outside recess and engaging as stated the intervals between two threads of the screw 8.

A similar ring 43 is mounted in the same manner through the agency of a ball bearing 44 on the spindle 38 and projects inside the female threads of the screw 8 on the side thereof that is diametrically opposed to the location of the first ring 42 with reference to the screw axis. The sleeve 36 bears endwise through the agency of a ball bearing 45 against the wall of a casing 46 that is secured to the frame 1 of the machine. On the opposite side, said sleeve 46 is secured to the outer bearing nut 27 through the agency of the pins 47 and 48 that are bestowed with a certain elasticity. The outer nut 27 engages on the other hand the wall of the support or frame 1 of the machine.

The arrangement disclosed operates in the following manner: when, under the action of the rotary movement of the movable helical slope, the worm 8 moves axially in the direction of the arrow $f_1$, the sleeve 36, the rings 42 and 43 inside which engage the threads of said screw 8, moves together with said screw and engages the wall of the casing 46 rigid with the frame through the agency of the ball bearing 45. The rings 42 and 43 roll over the sides of the threads of the screw 8 as the system constituted by the sleeve 36, the spindles 37—38, the ball bearings 41 and 44 and said rings 42—43 forms a sort of reversible nut, in other words said system is capable of rotating round the axis of the screw 8 when said screw on which it is engaged is submitted to an axial thrust. During its rotation, the sleeve 36 carries along with it the outer nut 27 through the agency of the pins 47 and 48. Said nut 27 remains during its rotation in engagement with the frame 1 in spite of the axial shifting of the screw 8 in the direction of the arrow $f_1$.

The screw 8 cannot therefore move rearwardly when the driving action is no longer applied in the direction of the arrow $f_1$. When it is desired to give the pins 47 and 48 a certain elasticity, they may be constituted by a steel core fitted inside a rubber tube.

Fig. 6 is an axial cross-sectional view of the control mechanism in a machine according to a further embodiment of the invention.

Said mechanism is contained inside a casing constituted by a tubular section 50 closed by two flanges 51 and 52 that are freely carried on the screw 8 and are held fast against the tubular section 50 through the agency of threaded rods 53 and nuts 54.

The sleeve 11 provided with the helical slope 13 engages the inner surface of the flange 51 to which it is secured through the screws 55².

Figure 7:
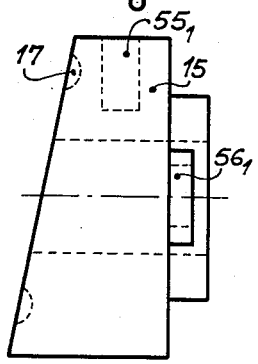
Figs. 7 and 8 are side and front views of the control ring of the machine illustrated in Fig. 6.
Figure 8:
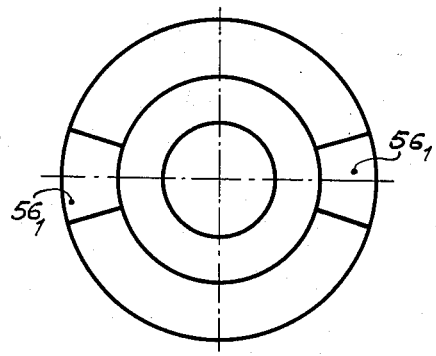

The control ring 15 provided with a helical slope as illustrated in Figs. 7 and 8 is carried freely by the control screw 8 just beyond the sleeve 11. Said control ring is rigid with a control lever 55 held inside a recess 55¹ in the control ring (Fig. 7), said lever projecting outside the tubular casing 50 through an arcuate slot provided in said casing. Said slot forms a guide and its ends form stops for said control lever 55. Lastly, inside an annular recess provided in the flat surface 16 of the control ring is fitted a ring 56 that is secured through connecting dogs 56¹ (Figs. 6 to 10).

The thrust nut 23 screwed over the control worm 8 is provided in the case illustrated in Fig. 6 with a series of perforations 57 that are regularly distributed, each of said perforations containing two pusher rods 58—59 between which is inserted a spring 60.

The ring 56 on the ring 15 on one hand and the inner surface of the flange 52 on the other hand are provided with blind holes registering with the pusher rods 58 and 59, the number of said blind holes differing from that of the perforations 57 housing the pusher rods 58 and 59.

If the thrust nut 23 is provided say with ten perforations, the flange 52 and the ring 56 may be provided for instance each with twelve blind openings that are regularly distributed and are adapted to receive the ends of the pusher rods 58 and 59 housed inside the perforations of the thrust nut.

Figure 12:
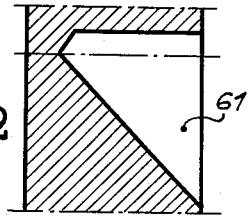
Fig. 12 is a cross-sectional detail view showing the recess in said ring.
Figure 10:
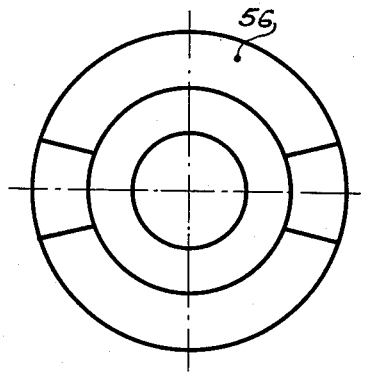
Figs. 10 and 11 are views of either side of last-mentioned annulus.
Figure 9:
Fig. 9 is a side view of the annulus rigid with said ring.
Figure 11:
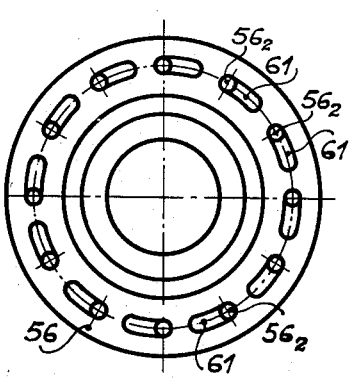

The twelve blind holes 52¹ provided in the flange 52 open into slopes 61 assuming all a predetermined direction while the twelve blind holes 56² in the ring 56 open into a slope 61 facing an opposite direction. (Figs. 11 and 12.)

A spring 62 connects as precedingly the control nut 23 with the outer bearing nut 27, said spring fitted over the control worm 8 being housed freely inside an annular opening provided in the flange 52.

In the machine that has just been described, the flange 52 replaces the bearing ring 29 of the machine illustrated in Fig. 1 and the pusher rods 58 and 59 replace the inner ring 30 of said machine while the ring 52 plays the same part as the former outer ring 32.

If it is supposed that the thrust nut is provided with ten perforations, while the flange 52 and the ring 56 include twelve blind holes and that the drive is obtained through the pusher members 58—59 engaging a blind hole 56₂ it is necessary in order to provide for the drive through adjacent pusher member, to constrain the nut 23 to rotate with reference to the ring 56 or with reference to the flange 52 by an angle equal to $$\frac{1}{10}-\frac{1}{12}=\frac{6}{60}-\frac{5}{60}=\frac{1}{60}$$

of a circumference. This differential system is executed by forming ten perforations in the control nut, twelve blind holes in the ring 56 and twelve blind holes in the flange 52, which makes 34 openings altogether, of which 24 are provided with a lateral slope 61 obtained through a cutter.

Now the corresponding arrangement executed with toothed rings as in the case of Fig. 1 requires cutting four systems of 60 teeth, to wit 240 teeth in all, which corresponds to a much more important machining.

Lastly, in the case of the example illustrated, to wit: 10 perforations in the control or thrust exerting nut 23 and 12 blind openings for the ring 56 and for the flange 52, the drive is always executed through two pusher members 58—59 that are diametrically opposed to one another, whereby symmetrical stresses with reference to the axis of the control screw 8 are provided.

Figure 13:
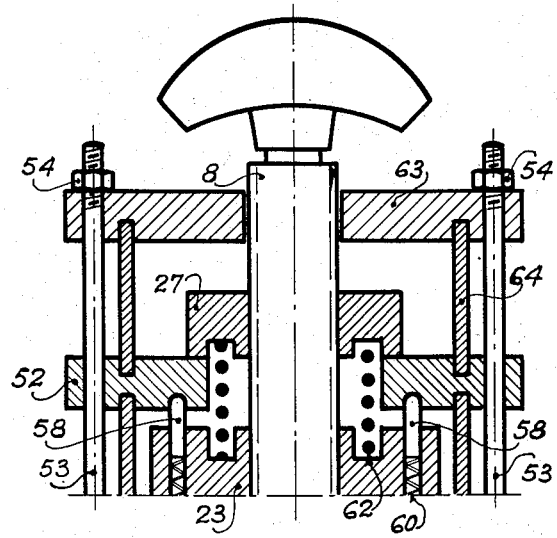
Fig. 13 is a partial cross-sectional view of a modification of the machine.

In order to obtain a better guiding of the control screw with reference to the frame, it is possible to locate ahead of the flange 52 a third guiding flange 63 (Fig. 13) through which said control screw 8 and the threaded rods 53, held fast by their terminal nuts 54, pass, the threaded rods lying on the outside of a tubular section or sleeve 64 bearing against the second flange 52 and the third flange 53. The control screw 8 is thus guided in the two extreme flanges 51 and 63.

Fig. 14 is an axial cross section of a further embodiment of the machine. In this case, the control screw 8 is revolubly carried on one hand in a wall 65 of a casing 66 while it rests on the other hand inside the opposite wall of the said casing through the agency of an inner extension 27¹ of the outer bearing nut 27, said extension being revolubly carried inside last mentioned wall of the casing.

The screw 8 passes freely through the sleeve 11 carrying the helical slope 13. Said control screw carries as precedingly the control ring 15 mounted freely over said screw.

To the thrust nut 23 is keyed a metal ring 67 and to the extension 27¹ of the outer nut 27 that engages the casing wall is keyed another metal ring 68.

An auxiliary shaft 69 parallel with the screw 8 is revolubly carried in the wall of the casing 66 and in a bearing 70 rigid with said casing.

To said auxiliary shaft 69 are keyed two rings 71—72, of rubber or raw hide, engaging respectively the cooperating metal rings 67 and 68 on the nuts 23 and 27.

To the end of the auxiliary shaft 69 are keyed two pinions 73—74 toothed over half their periphery and of which the former is adapted to mesh with a first segment 75 provided with teeth on its inner side and rigid with the control ring 15 while the other pinion 74 is adapted to mesh with a second segment 76 provided with an outer series of teeth and that is also rigid with the said control ring 15.

The machine in Fig. 14 operates in the following manner: at the end of the return stroke of the control lever 55, the toothed segments 75 and 76 rigid with the control ring 15 assume the position illustrated in Fig. 17.

*Operative stroke.*—The lever 55 being actuated again, this causes the control ring 15 to move as precedingly with its helical slope 17 remaining in engagement with the helical slope 13 on the sleeve 11, said ring moving consequently in the direction of the arrow $f_1$ and urging in the same direction the thrust nut 23 and the screw 8 on which said thrust nut is held fast frictionally.

During this operative stroke, the toothed segment 75 rigid with the control ring 15 moves in the direction of the arrow $f_2$ (Fig. 17) and drives along with it the pinion 73 through its semi-cylindrical series of teeth so that said pinion rotates in the direction of the arrow $f_3$. Said pinion 73 drives in its turn the auxiliary shaft 69 together with the elastic rings 71 and 72 keyed to said shaft whereby, by reason of the frictional contact between said rings 71 and 72 and the corresponding metal rings 67 and 68 the thrust nut 23 and bearing nut 27 are constrained to rotate in a direction such that said nuts are screwed over the control screw 8 and are urged back respectively in the case of the thrust nut 23 against the control ring 15 and in the case of the bearing nut against the wall of the casing 66.

At the end of the operative stroke, the toothed segment 75 is disengaged with reference to the semi-cylindrical series of teeth on the pinion 23 while the similar teeth on the other pinion engage the teeth on the outside of the other toothed segment 76, as illustrated in Fig. 18.

*Return stroke.*—The control lever 55 is urged in a direction opposed to that corresponding to its operative stroke and the toothed segment 76 rocks in the direction illustrated by the arrow $f_4$ (Fig. 18) and carries along with it the pinion 74 provided with a semi-cylindrical series teeth in the direction disclosed precedingly i. e. in the direction of the arrow $f_3$.

The shaft 69 and the yielding rings 71 and 72 thereon are consequently also driven in the direction of said arrow $f_3$.

The ring 72 urges the bearing nut into rotation but said nut 27 that is held fast against the wall of the casing 66 is prevented from executing such a rotation and the yielding ring 72 slides over the metal ring 68 that remains stationary.

In contradistinction, the ring 71 produces an actual rotation of the thrust ring 23 that is screwed over the control screw 8 and urges it against the control ring 15. The latter may move in a direction opposed to $f_1$ by reason of the gradual relative movement of said control ring 15 with reference to the sleeve 11.

At the end of the return stroke, the pinion 73 provided with a semi-cylindrical series of teeth engages again the teeth on the toothed segment 75 and the operations begin over again as described precedingly. As in the case of Fig. 1, the return of the screw 8 into its inoperative position is performed through the agency of a crank fitted endwise over the control screw so as to produce a rotation of said screw inside the now stationary nuts 23 and 27.

The machines described hereinabove may be used in all cases where it is necessary to exert a large and gradual stress, for instance in bending, punching, stamping presses, in wine presses, oil presses, shears, jacks and the like.

A machine such as that illustrated in Fig. 6 and forming a metal bending press is illustrated in Fig. 19 as a whole.

In this case, the threaded rods 53 extend beyond the flange 63 and are assembled through nuts 77 with two channel irons facing opposite directions as shown at 78 and 79 and that are parallel with one another in a direction perpendicular to the threaded rods. Between said channel members are revolubly carried the bearing rollers 80. Feet 81 and 82 are pivotally secured on one hand to the flange 51 and on the other to the lower channel member 79 for carrying the machine above ground.

The above described machines show in particular the following technical advantages:

1. The transformation of the angular reciprocating movement of the ring 15 into an axial shifting of said ring and of the screw 8 is provided through helical slopes 13 and 17 of equal pitches that do not slide directly over one another but roll over one another through the agency of a series of balls 21. The frictional resistances are thus replaced by rolling resistances the value of which is much lower. The energy uselessly absorbed between the movable members is considerably reduced and this decreases the efficiency of the machine.

2. The machine is provided with a rough moving-in control through the agency of the crank 10 that is independent of the actual stress producing lever. This cuts out useless losses of time.

3. The machine includes a minimum number of parts the manufacture of which is comparatively easy and it is also strong and of a reduced bulk and cost price.

What I claim is:

1. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, means for controlling the angular movements of the slope-carrying ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, and means controlling the rotation of the screw for screwing the same into and out of the thrust nut and means for normally preventing the rotation of said thrust nut with reference to the support.

2. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, means for controlling the angular movements of the slope-carrying ring, a thrust nut screwed over the screw, on the side of the ring that does not face the sleeve, rolling means between the thrust nut and the slope-carrying ring, said thrust nut being urged forwardly with the screw under the action of the forward movement of the ring when it rises over the helical slope on the sleeve, releasable means preventing the rotation of the thrust nut with reference to the support, an outer auxiliary nut threaded over the screw on the outside of the support and engaging the surface thereof facing the thrust exerting member, elastic means connecting the two nuts with one another for urging the thrust nut against the slope-carrying ring, the outer nut being urged against the surface of the support through the reaction exerted on the thrust member.

3. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the worm and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, means for controlling the rotation of the screw for screwing same into and out of the thrust nut, a lateral projection on the lever and a double ratchet system controlled by said projection and controlling the angular position of the thrust nut in a direction urging said thrust nut against the slope carrying ring when the latter recedes, under the action of its lever controlled rotation.

4. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, an outer auxiliary nut threaded over the screw on the outside of the support and adapted to be urged against said support by the reaction exerted on the thrust member and a coil spring connecting the two nuts with one another and adapted to be angularly tensioned through the rearward movement of the thrust nut and to urge the outer nut into a screwing movement over the screw.

5. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, means for controlling the rotation of the screw for screwing same into and out of the thrust nut, a lateral projection on the lever and a double ratchet system controlled by said projection and controlling the angular position of the thrust nut in a direction urging said thrust nut against the slope carrying ring when the latter recedes, under the action of its lever controlled rotation, said double ratchet system surrounding coaxially the thrust nut and including a first ring bearing against the wall of the recess of the support, an intermediary ring coaxial with the bearing ring and adapted to rotate only in one direction with reference thereto, means constraining said intermediary ring to rotate in unison with the thrust nut, a third ring adapted to rotate over the intermediary ring only in the direction that is opposed to the direction of rotation of the intermediary ring with reference to the bearing ring, said third ring being provided with an arcuate slope adapted to be engaged by the projection on the lever for allowing its drive by said lever whereby said third ring is driven into rotation with the intermediary ring in the allowed direction urging the thrust nut against the slope carrying ring and yielding means between the slope-carrying ring and the third ring for urging the last mentioned system of first, intermediary and third rings against the corresponding surface of the recess in the support.

6. In a power press and the like thrust operated machine, the combination of a recessed support, a screw revolubly carried in said support and extending through the recess therein and beyond at least one wall of said recess, a thrust member rigid with one projecting end of said screw, a sleeve provided with a helical slope freely surrounding the screw and bearing against the recessed wall on the inside of the support, a ring revolubly surrounding the screw provided with a helical slope facing the first helical slope and assuming the same pitch as the latter, rolling members mounted between the cooperating helical slopes, means for controlling the angular movements of the slope-carrying ring, a thrust nut screwed over the screw on the side of the ring that does not face the sleeve, rolling members between the thrust nut and the slope-carrying ring, said thrust nut being urged forwardly with the screw under the action of the forward movement of the ring when it rises over the helical slope on the sleeve and bearing rollers adapted to cooperate with the thrust member and revolubly carried by the support.

7. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, means for controlling the angular movements of the slope-carrying ring, a thrust nut screwed over the screw, on the side of the ring that does not face the sleeve, rolling means between the thrust nut and the slope-carrying ring, said thrust nut being urged forwardly with the screw under the action of the forward movement of the ring when it rises over the helical slope on the sleeve, releasable means preventing the rotation of the thrust nut with reference to the support, an outer auxiliary nut threaded over the screw on the outside of the support and engaging the surface thereof facing the thrust exerting member, elastic means connecting the two nuts with one another for urging the thrust nut against the slope-carrying ring, the outer nut being urged against the surface of the support through the reaction exerted on the thrust member, a sleeve coaxial with the screw on the outside of the outer nut with reference to the support, means constraining said sleeve to rotate in unison with the outer nut, a casing enclosing said sleeve and rigid with the support, projecting elements on the inside of said sleeve adapted to engage diametrically opposed points of the screw and a ball bearing fitted between the outer end of the sleeve and the casing wall.

8. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the side of the support, a ring revolubly surrounding the screw and provided with a helical slope facing the first helical slope and assuming the same pitch as the latter, rolling members mounted between the cooperating helical slopes, means for controlling the angular movements of the slope-carrying ring, a thrust nut screwed over the screw, on the side of the ring that does not face the sleeve, rolling means between the thrust nut and the slope-carrying ring, said thrust nut being urged forwardly with the screw under the action of the forward movement of the ring when it rises over the helical slope on the sleeve, releasable means preventing the rotation of the thrust nut with reference to the support, an outer auxiliary nut threaded over the screw on the outside of the support and engaging the surface thereof facing the thrust exerting member, elastic means connecting the two nuts with one another for urging the thrust nut against the slope-carrying ring, the outer nut being urged against the surface of the support through the reaction exerted on the thrust member, a sleeve coaxial with the screw on the outside of the outer nut with reference to the support, means constraining said sleeve to rotate in unison with the outer nut, a casing enclosing said sleeve and rigid with the support, radial spindles carried by the sleeve in oppositely directed relationship in a common diametrical plane and axially shifted with reference to one another by one screw pitch interval, ring shaped projections revolubly carried by said spindles and engaging the screw and a ball bearing fitted between the outer end of the sleeve and the casing wall.

9. in a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the side of the support, a ring revolubly surrounding the screw and provided with a helical slope facing the first helical slope and assuming the same pitch as the latter, rolling members mounted between the cooperating helical slopes, means for controlling the angular movements of the slope-carrying ring, a thrust nut screwed over the screw, on the side of the ring that does not face the sleeve, rolling means between the thrust nut and the slope-carrying ring, said thrust nut being urged forwardly with the screw under the action of the forward movement of the ring when it rises over the helical slope on the sleeve, releasable means preventing the rotation of the thrust nut with reference to the support, an outer auxiliary nut threaded over the screw on the outside of the support and engaging the surface thereof facing the thrust exerting member, elastic means connecting the two nuts with one another for urging the thrust nut against the slope-carrying ring, the outer nut being urged against the surface of the support through the reaction exerted on the thrust member, a sleeve coaxial with the screw on the outside of the outer nut with reference to the support, yielding studs extending axially and adapted to connect the last mentioned sleeve with the outer nut, a casing enclosing said sleeve and rigid with the support, radial spindles carried by the sleeve in oppositely directed relationship in a common diametrical plane and axially shifted with reference to one another by one screw pitch interval, ring shaped projections revolubly carried by said spindles and engaging the screw and a ball bearing fitted between the outer end of the sleeve and the casing wall.

10. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, the thrust nut being provided with an annular series of perforations extending in parallelism with the axis of the nut, pusher members in the nut perforations, the surfaces of the slope-carrying ring and of the support facing said thrust nut being provided with similar series of recesses adapted to be engaged by the corresponding ends of the pusher members in the nut perforations and said recesses opening through slopes into the corresponding surfaces to allow said pusher members to move out of the recess in either surface for a corresponding direction of rotation thereof to urge the thrust nut against the slope carrying ring when the latter recedes under the action of its lever controlled rotation.

11. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, the thrust nut being provided with an annular series of perforations extending in parallelism with the axis of the nut, a couple of pusher members and a spring separating said pusher members, in the nut perforations, the surfaces of the slope-carrying ring and of the support facing said thrust nut being provided with similar series of recesses adapted to be engaged by the corresponding ends of the pusher members in the nut perforations and said recesses opening through slopes into the corresponding surfaces to allow said pusher members to move out of the recess in either surface for a corresponding direction of rotation thereof to urge the thrust nut against the slope carrying ring when the latter recedes under the action of its lever controlled rotation.

12. In a power press and the like thrust operated machine, the combination of a recessed support, a screw revolubly carried in said support and extending through the recess therein and beyond at least one wall of said recess, a thrust exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, the thrust nut being provided with an annular series of perforations extending in parallelism with the axis of the nut, a couple of pusher members and a spring separating said pushers members, in the nut perforations, the surfaces of the slope-carrying ring and of the support facing said thrust nut being provided with similar series of recesses adapted to be engaged by the corresponding ends of the pusher members in the nut perforations, the number of perforations differing from that of the recesses in either surface, said recesses opening through slopes into the corresponding surfaces to allow said pusher members to move out of the recess in either surface for a corresponding direction of rotation thereof to urge the thrust nut against the slope carrying ring when the latter recedes under the action of its lever controlled rotation.

13. In a power press and the like thrust operated machine, the combination of a casing including a tubular section, two covers therefor, a screw revolubly carried in said covers and extending axially of the tubular section and beyond at least one cover, a thrust member rigid with one projecting end of said screw, a sleeve provided with a helical slope freely surrounding the screw inside the tubular section and bearing against the cover on the side furthest from the thrust member, a ring revolubly surrounding the screw, provided with a helical slope facing the first helical slope and assuming the same pitch as the latter, and also contained inside the tubular section, balls inserted between the cooperating helical slopes, a lever rigid with the slope carrying ring for imparting a reciprocating angular movement to said ring, a thrust nut screwed inside the tubular section over the screw on the side of the ring that does not face the sleeve, balls inserted between the thrust nut and the slope-carrying ring, said thrust nut being urged forwardly with the screw under the action of the forward movement of the ring when it rises over the helical slope on the sleeve, an outer auxiliary nut threaded over the screw on the outside of the cover facing the thrust member and engaging the surface thereof, a coil spring connecting the two nuts with one another for urging the thrust nut against the slope carrying ring, the outer nut being urged against the surface of the support through the reaction exerted on the thrust member and means for removably securing the covers on the tubular section.

14. In a power press and the like thrust operated machine, the combination of a casing including a tubular section, two covers therefor, a screw revolubly carried in said covers and extending axially of the tubular section and beyond at least one cover, a thrust member rigid with one projecting end of said screw, a sleeve provided with a helical slope freely surrounding the screw inside the tubular section and bearing against the cover on the side furthest from the thrust member, a ring revolubly surrounding the screw, provided with a helical slope facing the first helical slope and assuming the same pitch as the latter, and also contained inside the tubular section, balls inserted between the cooperating helical slopes, a lever rigid with the slope carrying ring for imparting a reciprocating angular movement to said ring, a thrust nut screwed inside the tubular section over the screw on the side of the ring that does not face the sleeve, balls inserted between the thrust nut and the slope-carrying ring, said thrust nut being urged forwardly with the screw under the action of the forward movement of the ring when it rises over the helical slope on the sleeve, an outer auxiliary nut threaded over the screw on the outside of the cover facing the thrust member and engaging the surface thereof, a coil spring connecting the two nuts with one another for urging the thrust nut against the slope carrying ring, the outer nut being urged against the surface of the support through the reaction exerted on the thrust member, a third cover coaxially and revolubly carrying the outer end of the screw on the outside of the outer nut, a further tubular section fitted between the outer casing cover and the third cover and a plurality of threaded rods and nuts associated therewith for clamping removably in position the three covers over the two intermediary tubular sections.

15. In a power press and the like thrust operated machine, the combination of a casing including a tubular section, two covers therefor, a screw revolubly carried in said covers and extending axially of the tubular section and beyond at least one cover, a thrust member rigid with one projecting end of said screw, a sleeve provided with a helical slope freely surrounding the screw inside the tubular section and bearing against the cover on the side furthest from the thrust member, a ring revolubly surrounding the screw, provided with a helical slope facing the first helical slope and assuming the same pitch as the latter, and also contained inside the tubular section, balls inserted between the cooperating helical slopes, a lever rigid with the slope carrying ring for imparting a reciprocating angular movement to said ring, a thrust nut screwed inside the tubular section over the screw in the side of the ring that does not face the sleeve, balls inserted between the thrust nut and the slope-carrying ring, said thrust nut being urged forwardly with the screw under the action of the forward movement of the ring when it rises over the helical slope on the sleeve, an outer auxiliary nut threaded over the screw on the outside of the cover facing the thrust member and engaging the surface thereof, a coil spring connecting the two nuts with one another for urging the thrust nut against the slope carrying ring, the outer nut being urged against the surface of the cover through the reaction exerted on the thrust member, a third cover coaxially and revolubly carrying the outer end of the screw on the outside of the outer nut, a further tubular section fitted between the outer casing cover and the third cover and a plurality of threaded rods and nuts associated therewith for clamping removably in position the three covers over the two intermediary tubular sections, the thrust nut being provided with an annular series of perforations extending in parallelism with the axis of the nut, pusher members in the nut perforations, the surfaces of the slope-carrying ring and of the cover on the thrust member side facing said thrust nut being provided with similar series of recesses adapted to be engaged by the corresponding ends of the pusher members in the nut perforations, said recesses opening through slopes into the corresponding surfaces to allow said pusher members to move out of the recesses in either surface for a corresponding direction of rotation thereof, to urge the thrust nut against the slope carrying ring when the latter recedes under the action of its lever controlled rotation.

16. In a pipe-bending machine, the combination of a recessed support, a screw revolubly carried in said support and extending through the recess therein and beyond at least one wall of said recess, a thrust-exerting member rigid with one projecting end of said screw, a sleeve provided with a helical slope freely surrounding the screw and bearing against the recessed wall on the inside of the support, a ring revolubly surrounding the screw and provided with a helical slope facing the first helical slope and assuming the same pitch as the latter, rolling members mounted between the cooperating helical slopes, a lever rigid with the slope-carrying ring for imparting a reciprocating angular movement to said ring, a thrust nut screwed over the screw on the side of the ring that does not face the sleeve, rolling means between the thrust nut and the slope-carrying ring, said thrust nut being urged forwardly with the screw under the action of the forward movement of the ring when it rises over the helical slope on the sleeve, the thrust nut being provided with an annular series of perforations extending in parallelism with the axis of the nut and helical slopes, pusher members in the nut perforations, the surfaces of the slope-carrying ring and of the support facing said thrust nut being provided with similar series of openings adapted to be engaged by the corresponding ends of the pusher members in the nut perforations and said openings merging through slopes into the corresponding surfaces to allow said pusher members to move out of the openings in either surface for a corresponding direction of rotation thereof to urge the thrust nut against the slope-carrying ring when the latter recedes under the action of its lever-controlled rotation, rods rigidly secured to the recessed support and extending beyond the end thereof provided with openings, beams rigidly assembled with the outer ends of said threaded rods and rollers carried between said beams to freely revolve around axes perpendicular to the axis of the helical slopes and of the thrust nut and adapted to engage the pipes to be bent.

ELOI AURIOL.

References Cited in the file of this patent

UNITED STATES PATENTS

| Number | Name | Date |
|---|---|---|
| 265,042 | Elliott | Sept. 26, 1882 |
| 970,640 | McClintock | Sept. 20, 1910 |
| 1,088,242 | Rudolph | Feb. 24, 1914 |
| 2,151,094 | Fiorentino | Mar. 21, 1939 |
| 2,278,775 | Fiorentino | Apr. 7, 1942 |
| 2,311,677 | McKinney | Feb. 23, 1943 |

FOREIGN PATENTS

| Number | Country | Date |
|---|---|---|
| 800,260 | France | Apr. 27, 1936 |